United States Patent
Cox et al.

(10) Patent No.: US 7,281,688 B1
(45) Date of Patent: Oct. 16, 2007

(54) MATERIALS FOR SELF-TRANSPIRING HOT SKINS FOR HYPERSONIC VEHICLES OR REUSABLE SPACE VEHICLES

(75) Inventors: Brian Nelson Cox, Thousand Oaks, CA (US); Janet B. Davis, Thousand Oaks, CA (US); Julia Mack, Encino, CA (US); David Bruce Marshall, Thousand Oaks, CA (US); Peter E. Morgan, Thousand Oaks, CA (US); Olivier H. Sudre, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/380,450

(22) Filed: Apr. 27, 2006

(51) Int. Cl.
*B64G 1/58* (2006.01)
(52) U.S. Cl. .................. 244/159.1; 244/171.7
(58) Field of Classification Search ............. 244/159.1, 244/171.7, 171.8, 159.3
See application file for complete search history.

(56) References Cited

U.S. PATENT DOCUMENTS

| 3,182,469 A * | 5/1965 | Kirchner ............... 62/467 |
|---|---|---|
| 3,321,154 A * | 5/1967 | Downs ................ 244/159.1 |
| 4,124,732 A * | 11/1978 | Leger .................... 428/77 |
| 5,489,074 A * | 2/1996 | Arnold et al. .......... 244/159.1 |
| 5,904,791 A * | 5/1999 | Bearinger et al. ....... 156/89.11 |
| 6,663,051 B2 * | 12/2003 | Okuyama .............. 244/171.7 |
| 6,866,733 B1 * | 3/2005 | Denham et al. ........ 156/89.11 |
| 2003/0025040 A1 * | 2/2003 | Okuyama .............. 244/158 A |

* cited by examiner

Primary Examiner—Tien Dinh
Assistant Examiner—Joseph W Sanderson
(74) Attorney, Agent, or Firm—Ostrager Chong Flaherty & Broitman P.C.

(57) ABSTRACT

A self-transpiring hot skin for a hypersonic or reusable space vehicle that can provide protection to the vehicle during short periods of abnormally high heat flux (either planned in the flight profile or an off-nominal event). The hot skin includes a ceramic composite structure having an internal cavity that is coupled either to the insulating layer or directly to the support structure of the hypersonic vehicle. The internal cavity includes a material system that vaporizes, sublimes or decomposes into a gas when the temperature exceeds the upper temperature capability of the composite material. The gas transpires through the outer layer of the composite material to provide cooling to the outer layer below the upper temperature capability. Cooling may occur both by conduction of heat from the composite material to the transpiring gas and by the interaction of the transpiring gas with the boundary layer of hypersonic flow over the outer surface, leading to a reduction of the heat flux entering the surface.

17 Claims, 1 Drawing Sheet

MATERIALS FOR SELF-TRANSPIRING HOT SKINS FOR HYPERSONIC VEHICLES OR REUSABLE SPACE VEHICLES

TECHNICAL FIELD

The present invention generally relates to thermal protection systems for hypersonic vehicles or reusable space vehicles and more specifically to materials for self-transpiring hot skins for hypersonic vehicles or reusable space vehicles.

BACKGROUND ART

At present, efforts are being undertaken to develop hypersonic or reusable space vehicles capable of reaching speeds as high as Mach 12. Examples of such vehicles include, for example, missiles, hypersonic cruise vehicles, and spacecraft such as the space shuttle.

Such hypersonic or reusable space vehicles are, of course, subject to extreme temperature fluctuations within the vehicle's envelope of performance. Specifically, the leading edges, flight control surfaces and a substantial portion of the external surfaces of such vehicle support structures, or frames, as well as the internal construction associated with engines necessary to power the vehicle require that thermal design parameters incorporate means for ensuring structural survivability during short periods of high heat flux. Thermal protection systems for hypersonic vehicles essentially fall into two categories: insulative and ablative. Insulative systems such as those used on the space shuttle have two advantages: (i) they are generally lighter in weight than ablative systems and (ii) they maintain a constant outer vehicle surface, whereas with ablative systems, recession of the outer surface occurs thus changing the aerodynamic shape of the vehicle. However, existing insulative systems are limited in the maximum allowable temperature (or heat flux) at the outer surface (mostly below ~1600 deg. C.), whereas ablative systems can be used to much higher temperatures (and heat fluxes). There exists a need to provide adequate thermal protection to hypersonic or reusable space vehicles in the event of a high heat load event that combines the most desirable attributes of both the insulative and ablative thermal protection systems. Such a system ideally also realizes other positive attributes such as cost and weight reduction.

SUMMARY OF THE INVENTION

The proposed invention combines the attributes of an insulative and ablative thermal protection system into a single integrated thermal protection system for a hypersonic or reusable space vehicle with the capability of surviving long periods of moderate heating with short periods of higher heating without sustaining structural damage due to overheating.

The present invention provides an integrated self-transpiring hot skin for a hypersonic or reusable space vehicle that can provide protection to the vehicle during short periods of high heat flux.

The hot skin includes a ceramic composite structure, or hot skin outer layer, having an internal cavity or cavities that are coupled to a support structure and coupled to an optional insulating layer of the hypersonic or space reusable vehicle. The internal cavities include an ablating material system (i.e. a system that vaporizes or sublimes or decomposes into a gas) at a temperature below the upper temperature capability of the composite material. The gas transpires through the outer layer of the composite material to provide cooling to the outer layer. Normally it would be preferred that only direct solid-gas reaction be allowed, with no melting or reaction melting.

The material system contained within the internal cavity is an effective solid chemical that undergoes an endothermic reaction (or possibly even mildly exothermic) in the desired temperature range to produce gases that can penetrate the porous ceramic material as it is being generated. One material system that meets these requirements is zinc nitride. Another material system that meets these requirements is a mixture of germanium nitride and germanium oxide. In addition, mixtures of these two systems are also contemplated and may provide cooling over a customized temperature range from about 600 to 1600 degrees Celsius. Several other nitrides or oxynitrides are also contemplated.

Other features, benefits and advantages of the present invention will become apparent from the following description of the invention, when viewed in accordance with the attached drawings and appended claims.

BEST MODES FOR CARRYING OUT THE INVENTION

Figure 1:
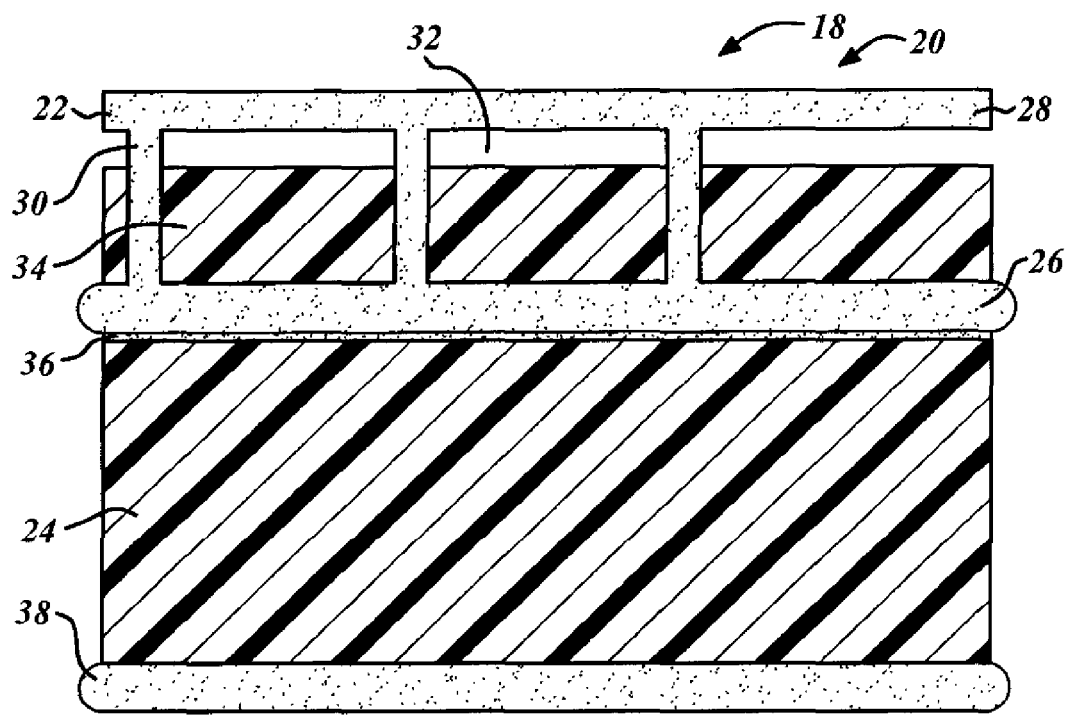
FIG. 1 is section view of a portion of a hypersonic or reusable space vehicle according to a preferred embodiment of the present invention operating in normal temperature conditions.

Referring now to FIG. 1, a region 18 of a hypersonic or reusable space vehicle 20 is depicted and includes a ceramic hot skin outer layer 22 coupled to an optional insulating layer 24, both of which are coupled over the outer support structure 38 of the vehicle 20. The outer layer 22 and optional insulating layer 24 together function to provide thermal protection for the vehicle support structure 38 and vehicle components during flight, although alternatively the outer layer 22 may provide adequate thermal protection in systems not requiring an insulating layer 24.

The hot skin outer layer 22 includes a back face 26 and a front face 28 coupled together using a series of connecting portions 30. The back face 26, front face 28, and connecting portions 30 together define one or more cavity structures 32. Thus, the hot skin outer layer itself qualifies as an insulative protection layer. The back face 26, front face 28, and connecting portions 30 of the hot skin may have a variety of geometric arrangements, including continuous porous structures in which the front face, back face and connecting portions are not clearly distinguished.

The hot skin outer layer 22 is formed of a ceramic matrix composite ("CMC") material that has high heat resistance and sufficient durability for use as a thermal protection system in hypersonic travel. One such CMC material is a carbon fiber-reinforced silicon carbide matrix composite (or "C—SiC"). Other CMC materials may include a carbon-carbon matrix composite, a silicon carbide reinforced silicon carbide matrix composite, and oxide-oxide composites. The front face 28 has a controlled porosity and has an upper temperature capability ($T_o$) of up to 1600 degrees Celsius.

The optional insulating layer 24 is a low thermal conductivity insulation material such as an insulating blanket or ceramic tiles that are well known in the art for use to thermally insulate (protect) reusable space vehicles such as the space shuttle. The insulating layer 24 has lower temperature resistant capabilities than the overlying hot outer skin layer 22 and so is an optional layer that is utilized to optimize the thermal protection aspect of the entire thermal protection system. The back face 26 of the hot skin 22 is preferably coupled to the insulating layer 24 using a high temperature adhesive 36 such as a preceramic polymer that forms a composite with heat treatment. In alternative preferred arrangements, the back face 26 could simply be coupled directly to the underlying support structure 38 of the vehicle 20 by mechanical means and the insulating layer 24 simply inserted between the underlying structure 38 and back face 26.

Coupled within each of the one or more cavity structures 32 is a solid material system 34 that provides ablative (i.e. transpiration cooling) thermal protection to the outer layer 22 during a short period of high heat flux within the region 18.

Figure 2:
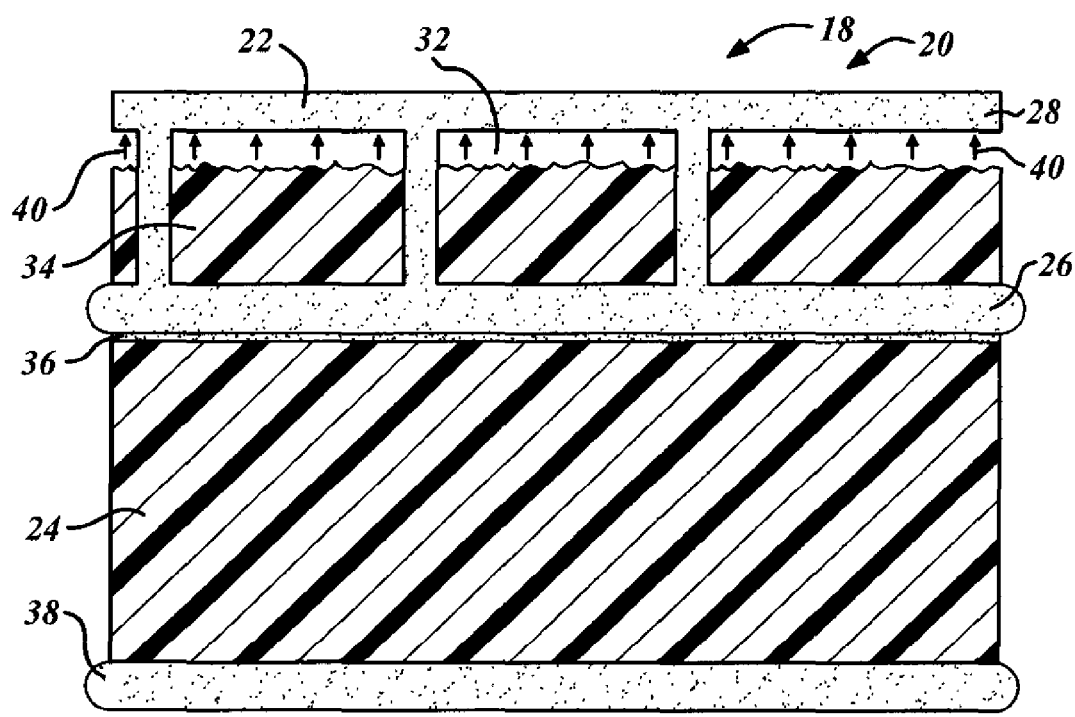
FIG. 2 is a section view of the portion of the hypersonic or reusable space vehicle of FIG. 1 during a short period of high heat flux.

As best shown in FIG. 2, the solid material system 34 undergoes a reaction that generates gas (shown as arrows 40) when the temperature of the vehicle 20 nears the upper temperature capability $T_o$ of the ceramic hot skin outer layer 22 in the region 18. The generation of gas 40 occurs as the solid material system 34 vaporizes, sublimes or decomposes (or, generally "ablates") in the presence of heat—in this case during a short period of high heat flux. The generated gas 40 flows through the porous structure of the front face 28 of the ceramic skin 22 and cools the front face 28 below the upper temperature capability $T_o$ during these short periods of abnormally high heat flux. This protects the integrity of the hot skin outer layer 22 and the vehicle support structure 38. The range of useful vaporization temperatures for systems utilizing a C—SiC ceramic hot skin outer layer 22 is expected to be between about 1000 and 1500 degrees Celsius.

The generation of gas 40 that occurs during this high heat flux event is the result of a chemical reaction of the solid material system 34. This reaction generates the gas 40 either through vaporization, sublimation, decomposition (i.e. an ablating reaction) or reaction with gas from the surrounding atmosphere without substantial melting depending upon the composition of the solid material system 34.

One preferred material system 34 that satisfies these requirements based on thermodynamic calculations is zinc nitride ($Zn_3N_2$), with the following reaction (1) (in an inert environment):

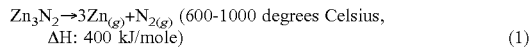

$$Zn_3N_2 \rightarrow 3Zn_{(g)} + N_{2(g)} \text{ (600-1000 degrees Celsius, } \Delta H: 400 \text{ kJ/mole)} \quad (1)$$

Thermal gravimetric analysis (TGA) has confirmed that the decomposition of zinc nitride into nitrogen gas ($N_{2(g)}$) and zinc vapor ($3Zn_{(g)}$) begins at around 600 degree Celsius leading to complete mass loss at around 1350 degrees Celsius.

The details of the decomposition, sublimation and vaporization rates are dependent upon numerous factors, including the temperature gradients, gas flow restriction within the front face 28, and ambient environment. A thicker front face 28 likely will have a larger temperature drop between front and back surfaces, and hence will require a longer period of high heat flux to initiate the vaporization reaction. Moreover, the porosity of the front face 28 will affect the flow rate of the gas 40 through the front face 28, with a more porous material allowing a larger flow of gas 40 within the front face 28

Further, the actual response of the zinc nitride material system 34 is also dependent upon the physical characteristics of the zinc nitride material system. For example, the particle size and powder confinement of the zinc nitride material system 34 within the cavity structure 32 may alter the temperature range of the vaporization reaction. A more finely ground powder will react (i.e. generate gas 40) more quickly than a coarser powder. Similarly, a more confined (i.e. packed) powder will react more slowly than a less confined powder material. Furthermore, the nature of the powder packing will affect the conduction of heat within the powder and thus the reaction rates.

Another preferred material system 34 that satisfies these requirements based on thermodynamic calculations consists of a mixture of germanium nitride ($Ge_3N_4$) and germanium oxide ($GeO_2$), with the following series of reactions (2), (3) and (4) (in an inert environment):

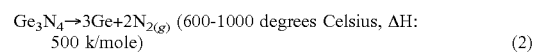

$$Ge_3N_4 \rightarrow 3Ge + 2N_{2(g)} \text{ (600-1000 degrees Celsius, } \Delta H: 500 \text{ k/mole)} \quad (2)$$

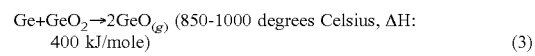

$$Ge + GeO_2 \rightarrow 2GeO_{(g)} \text{ (850-1000 degrees Celsius, } \Delta H: 400 \text{ kJ/mole)} \quad (3)$$

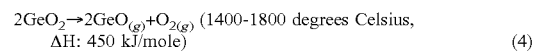

$$2GeO_2 \rightarrow 2GeO_{(g)} + O_{2(g)} \text{ (1400-1800 degrees Celsius, } \Delta H: 450 \text{ kJ/mole)} \quad (4)$$

Thermal gravimetric analysis (TGA) in an inert atmosphere has shown that mixtures of germanium nitride and germanium oxide result in complete decomposition of germanium nitride and reaction of germanium oxide to yield significant mass loss and the production of nitrogen, oxygen and GeO gases in an endothermic event.

In yet another preferred embodiment of the present invention, an ablating material system 34 may consist of mixtures and/or solid solutions of germanium nitride, germanium oxide and zinc nitride. This embodiment therein provides cooling, via the generation of gas 40 according to reaction mechanisms (1)-(4) described above, over a customized temperature range from about 600 to 1600 degrees Celsius.

The similar systems $Si_3N_4$, $Si_2N_2O$, and $Si_3N_4 + SiO_2$ behave similarly to the germanium cases, but at significantly higher temperatures. In addition, mixed crystals of the type $ZnGeN_2$ and $ZnSiN_2$ are known and could have some utility in covering large temperature ranges. Mixtures (e.g., $Zn_3N_2$ and $Si_3N_4$) in which one component ($Zn_3N_2$) decomposes at low temperatures and the other ($Si_3N_4$) decomposes at higher temperature could also be useful.

As the solid material system 34 is a non-regenerable resource, it is capable of protection for only a limited duration during a high heat flux event. However, the solid material system 34 may be replaced (possibly via introduction through a portal in the hot skin 22 or porous facesheet) for subsequent flights.

The proposed invention combines the attributes of an insulative and ablative thermal protection system into a single integrated system for a hypersonic or reusable space vehicle with the capability of surviving short periods of high heat flux (either planned in the flight profile or an off-nominal event) without sustaining structural damage due to overheating. The proposed invention is expected to be cost effective, and can extend the range of heat loads for insulative thermal protection systems. Moreover, by properly selecting the ablative material systems for the perceived temperature range of a high heat flux event, a customized thermal protection system can be achieved for a desired application. While not described in detail, it is specifically contemplated that other ablative materials, including carbon nitrides and melamines for example, may be used in conjunction, or in place of, the preferred embodiments described above in similar or materially different systems desiring thermal protection from adverse high heat flux events.

While the invention has been described in terms of preferred embodiments, it will be understood, of course, that the invention is not limited thereto since modifications may be made by those skilled in the art, particularly in light of the foregoing teachings.

What is claimed is:

1. A thermal protection system for a hypersonic or reusable space vehicle having an outer support structure, the thermal protection system comprising:
   a hot skin outer layer coupled to the outer support structure, said hot skin layer comprising a front face and a back face coupled together by at least one connecting portion, said back face closely coupled to said outer support structure and located between said outer support structure and said front face;
   an inner cavity defined by said front face, said back face and said at least one connecting portion; and
   an ablative material system contained within said inner cavity,
   wherein the hot skin outer layer is a continuous porous structure wherein said front face, said back face and said at least one connecting portion are indistinguishable.

2. The thermal protection system of claim 1, wherein said hot skin outer layer is mechanically attached to said outer support structure.

3. The thermal protection system of claim 1, further comprising an insulating material layer coupled between said hot skin outer layer and the outer support structure.

4. The thermal protection system of claim 3, wherein said insulating material is coupled to said back face of said hot skin outer layer with a high temperature ceramic adhesive.

5. The thermal protection system of claim 3, wherein said insulating material is selected from the group consisting of a thermal blanket and a plurality of ceramic tiles.

6. The thermal protection system of claim 1, wherein said hot skin outer layer comprises a ceramic matrix composite material.

7. The thermal protection system of claim 6, wherein said ceramic matrix composite material is selected from the group consisting of: a carbon fiber-reinforced silicon carbide matrix composite, a carbon-carbon matrix composite, a silicon carbide reinforced silicon carbide matrix composite, and oxide-oxide composites.

8. A thermal protection system for a hypersonic or reusable space vehicle having an outer support structure, the thermal protection system comprising:
   a hot skin outer layer coupled to the outer support structure, said hot skin layer comprising a front face and a back face coupled together by at least one connecting portion, said back face closely coupled to said outer support structure and located between said outer support structure and said front face;
   an inner cavity defined by said front face, said back face and said at least one connecting portion; and
   an ablative material system contained within said inner cavity,
   wherein said ablative material system comprises a member selected from the group consisting of: solid zinc nitride, a mixture of germanium nitride and germanium oxide, and a mixture of germanium nitride, germanium oxide and zinc nitride.

9. A thermal protection system for a hypersonic or reusable space vehicle having an outer support structure, the thermal protection system comprising:
   a hot skin outer layer coupled to the outer support structure, said hot skin layer comprising a front face and a back face coupled together by at least one connecting portion, said back face closely coupled to said outer support structure and located between said outer support structure and said front face;
   an inner cavity defined by said front face, said back face and said at least one connecting portion; and
   an ablative material system contained within said inner cavity,
   wherein said ablative material system is selected from the group consisting of: $Si_3N_4$, $Si_2N_2O$, $Si_3N_4$ and $SiO_2$, mixed crystals of the type $ZnGeN_2$ and $ZnSiN_2$, and mixtures of two components, wherein a first of the two components decomposes at a first temperature and the second of the two components decomposes at a second temperature higher than the first temperature.

10. The thermal protection system of claim 9, wherein said hot skin outer layer comprises a ceramic matrix composite material.

11. The thermal protection system of claim 10, wherein said ceramic composite material comprises a carbon fiber-reinforced silicon carbide matrix composite.

12. An ablative thermal protection system for a hypersonic or reusable space vehicle, the ablative thermal protection system comprising:
   a hot skin outer layer comprising a front face and a back face coupled together by at least one connecting portion;
   an inner cavity defined by said front face, said back face and said at least one connecting portion; and
   an ablative material system contained within said inner cavity,
   wherein said ablative material system comprises a member selected from the group consisting of solid zinc nitride, a mixture of germanium nitride and germanium oxide and a mixture of germanium nitride, germanium oxide and zinc nitride.

13. A method for forming an integrated insulating and ablative thermal protection system for a hypersonic and space reusable vehicle having a support structure, the method comprising:
   forming a hot skin outer layer comprising a front face and a back face coupled together by at least one connecting portion;
   coupling said hot skin outer layer to the support structure such that said back face is located between the support structure and said front face; and
   introducing an ablative material system within an inner cavity of said hot skin outer layer, said inner cavity defined by said front face, said back face and said at least one connecting portion, wherein said ablative material system ablates to generate a gas that transpires through said front face to cool said front face when a temperature of said front face exceeds an upper temperature capability of said front face,
   wherein introducing an ablative material system within an inner cavity of said hot skin outer layer comprises introducing a quantity of a substance selected from the group consisting of solid zinc nitride, a mixture of germanium nitride and germanium oxide, and a mixture of germanium nitride, germanium oxide and zinc nitride within an inner cavity of said hot skin outer layer, said inner cavity defined by said front face, said back face and said at least one connecting portion.

14. The method of claim 13, wherein introducing an ablative material system within an inner cavity of said hot skin outer layer comprises:

determining an upper temperature capability of said hot skin outer layer;

selecting a solid ablative material system which vaporizes, sublimes or decomposes via an endothermic reaction to form a gas at a temperature less than said upper temperature capability of said hot skin outer layer, said gas capable of cooling said hot outer skin to a temperature less than said upper temperature capability of said hot outer skin layer; and introducing said ablative material system with an inner cavity of said hot skin outer layer, said inner cavity defined by said front face, said back face and said at least one connecting portion.

15. The method of claim 13 further comprising coupling an insulating material between said outer skin layer and the support structure.

16. The method of claim 15, wherein coupling said insulating material comprises:

providing an insulating material selected from the group consisting of an insulating blanket and a plurality of ceramic tiles;

applying a preceramic polymer high temperature adhesive between said insulating material and said back face; and heating said preceramic polymer high temperature adhesive to form a ceramic material, said ceramic material coupling said insulating material to said back face.

17. The method of claim 13, wherein coupling said hot skin outer layer to the support structure such that said back face is located between the support structure and said front face comprises mechanically fastening a back face of said hot skin outer layer to the support structure such that said back face is located between the support structure and said front face.

* * * * *